(12) United States Patent
Moore et al.

(10) Patent No.: US 6,920,242 B1
(45) Date of Patent: *Jul. 19, 2005

(54) APPARATUS AND METHOD FOR POINT CLOUD ASSEMBLY

(76) Inventors: Ronald W. Moore, 23720 Webb Rd., Chatsworth, CA (US) 91311; Peisheng Gao, 128 S. Chapel Ave., No. 28, Alhambra, CA (US) 91801; Mark S. Knighton, 1920 LaMesa Dr., Santa Monica, CA (US) 90402

( * ) Notice: Subject to any disclaimer, the term of this patent is extended or adjusted under 35 U.S.C. 154(b) by 12 days.

This patent is subject to a terminal disclaimer.

(21) Appl. No.: 10/782,571

(22) Filed: Feb. 18, 2004

Related U.S. Application Data

(63) Continuation of application No. 10/183,735, filed on Jun. 26, 2002, now Pat. No. 6,701,006.

(51) Int. Cl.[7] ................................................ G06K 9/00
(52) U.S. Cl. ...................................... 382/154; 382/294
(58) Field of Search ................................. 382/154, 282, 382/284, 294; 345/419, 427, 629, 630, 634

(56) References Cited

U.S. PATENT DOCUMENTS

| 6,009,190 A | 12/1999 | Szeliski et al. ............. 382/154 |
| 6,078,701 A | 6/2000 | Hsu et al. .................... 382/294 |
| 6,104,840 A | 8/2000 | Ejiri et al. .................. 382/284 |
| 6,331,860 B1 | 12/2001 | Knox .......................... 345/620 |
| 6,516,099 B1 | 2/2003 | Davison et al. ............. 382/284 |
| 2003/0091226 A1 | 5/2003 | Cahill et al. ................. 382/154 |

OTHER PUBLICATIONS

Mark Bucci, *Using Genetic Algorithms*, C/C++ Users Journal, Jun. 2002, pp. 20–29.
Berthold K.P. Horn, *Closed–form solution of absolute orientation using unit quaternions*, Nov. 25, 1986, 629–642 pgs., vol. 4, Optical Society of America, Apr. 1987.
Paul J. Besl and Neil D. McKay, *A Method for Registration of 3–D Shapes*, May 6, 1991, 239–255 pgs., vol. 14, No. 2, IEEE Transactions on Pattern Analysis and Machine Intelligence, Feb. 1992.

*Primary Examiner*—Andrew W. Johns
(74) *Attorney, Agent, or Firm*—Blakely, Sokoloff, Taylor & Zafman, LLP

(57) ABSTRACT

A method and apparatus for point cloud assembly are described. In one embodiment, the method includes the obtaining of a data set of a first point cloud and a data set of a second point cloud. Once obtained, a portion of geometry defined by each respective data set is identified, which substantially describes a similar geometric shape. Next, a transformation is computed, such that the portion of geometry in each data set aligns to substantially minimize alignment error. Finally, the computed transformation is applied to the first point cloud to register the first point cloud relative to the second point cloud. In one embodiment, identification of the geometric portion describing a substantially similar geometric shape may be performed utilizing geometric reference point information, image texture information or a combination thereof.

12 Claims, 14 Drawing Sheets

3D DATA SCANNING SYSTEM 100

ONLINE 3D SCANNING SYSTEM 200

ONLINE 3D SCANNING SYSTEM 300

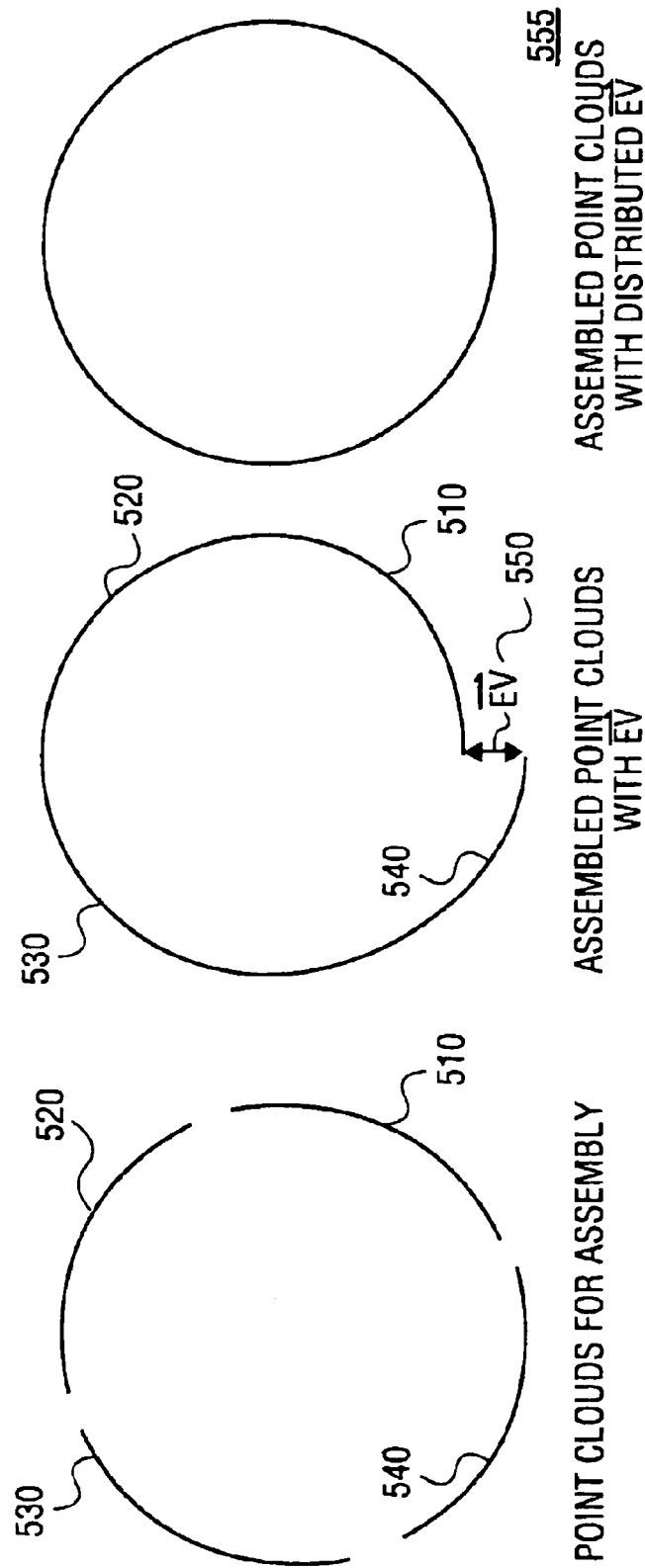

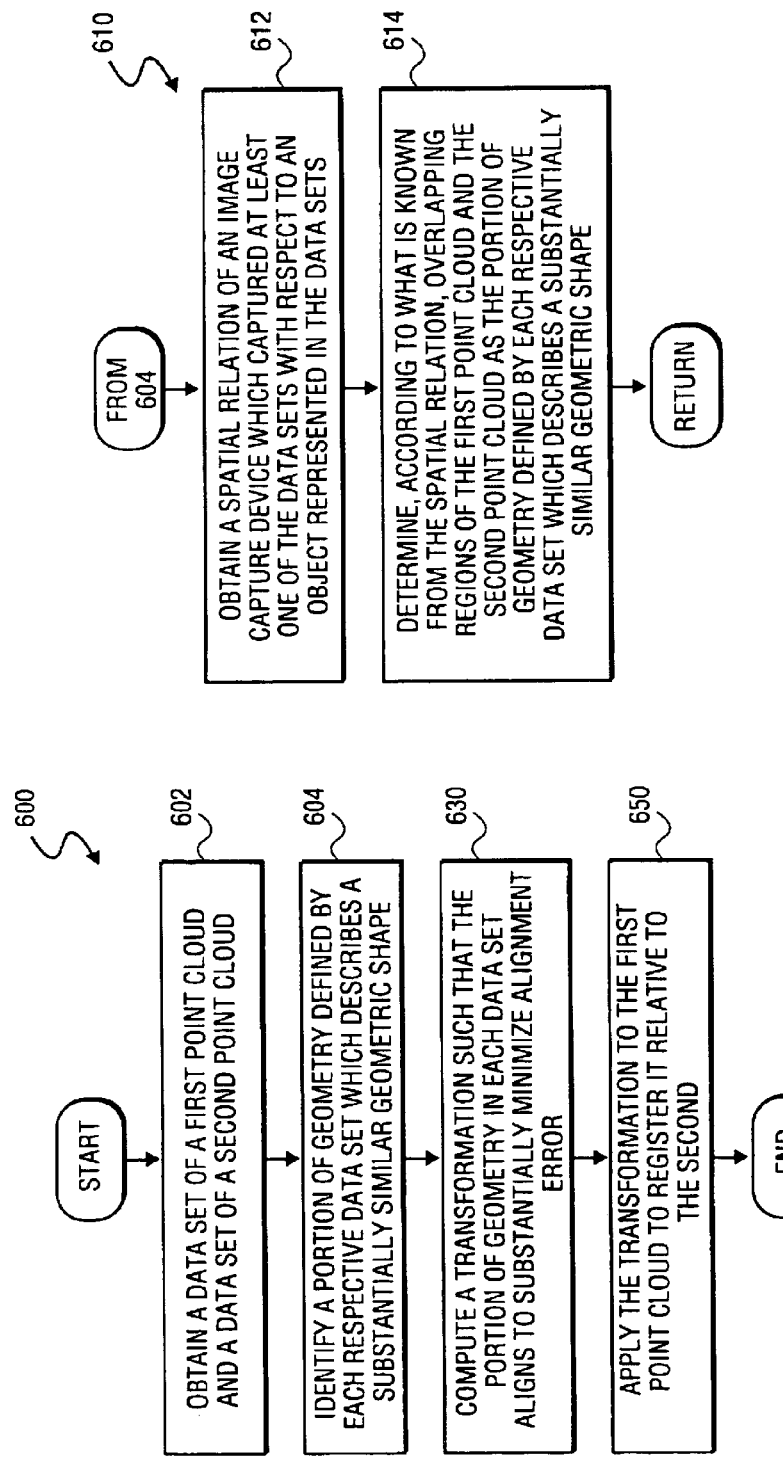

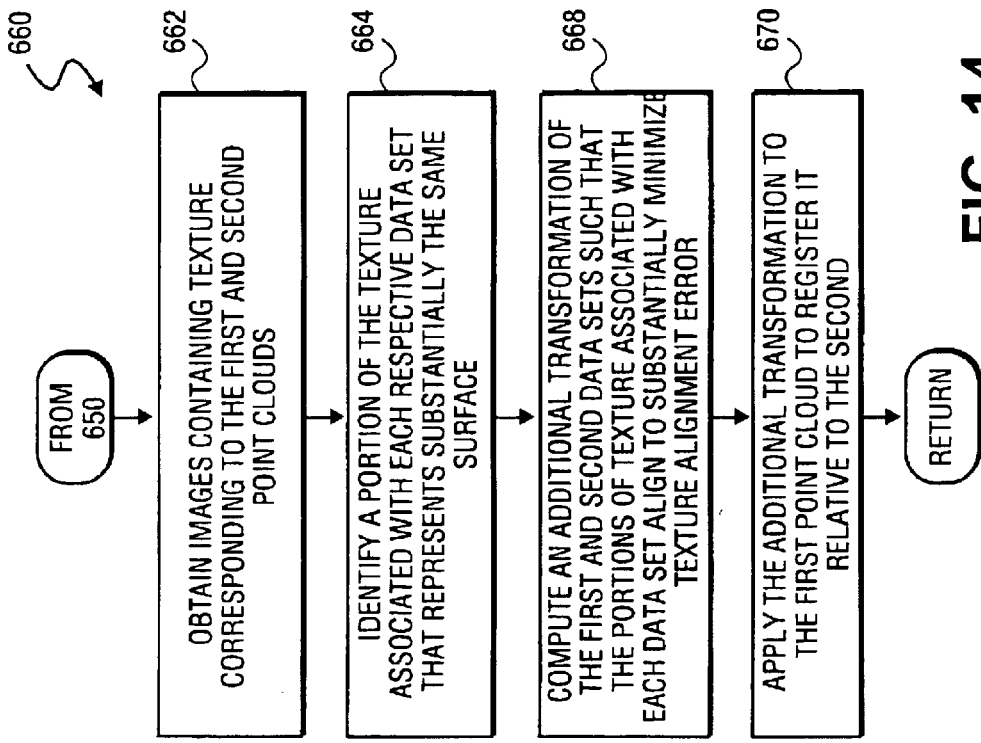

APPARATUS AND METHOD FOR POINT CLOUD ASSEMBLY

The application is a continuation of U.S. patent application Ser. No. 10/183,735, filed Jun. 26, 2002, now U.S. Pat. No. 6,701,006, entitled, AN APPARATUS AND METHOD FOR POINT CLOUD ASSEMBLY.

BACKGROUND OF THE INVENTION

1. Field of the Invention

One or more embodiments of the invention relate generally to the field of three-dimensional (3D) image rendering. More particularly, the invention relates to a method and apparatus for point cloud assembly.

2. Background of the Invention

Driven by the fields of computer vision, as well as range data processing, the real-time generation of three-dimensional (3D) images from a three-dimensional object within a computer system may one day become a reality. Generally, the process requires reverse engineering of accurate 3D models of real objects from, for example, 3D surface measurements or photographs. For example, given two sets of data and an initial estimate of the relative position, the iterative closest point algorithm (ICP) is used to register (align) the data sets by improving the position and orientation estimates.

Accordingly, the goal of the registration is to transform sets of surface measurements into a common coordinate system. However, capturing a complete object surface generally requires multiple range images from different viewpoints. Once these images are acquired, the various images must be combined (registered) utilizing algorithms, such as the ICP algorithm referred to above. Unfortunately, algorithms such as the ICP algorithm are dependent upon the initial position and orientation estimates. Moreover, the ICP approach, along with other data registration techniques perform in an iterative fashion.

Specifically, at each ICP iteration, correspondences are determined between the two data sets and a transformation is computed, which minimizes the mean square error (MSE) of the correspondences. Consequently, the iterations continue until either the MSE falls below some threshold value, the MSE reaches a local minima, or the maximum number of iterations is exceeded. Unfortunately, due to its fairly large computational expense, ICP is typically considered to be a batch, or at best, user-guided process, where users initiate and assist the process and then allow the process to execute, often overnight.

Other approaches for registering sets of data relative to a common coordinate system are provided. However, the various registration solutions also operate based on position and orientation estimates. As such, these additional registration algorithms can also have conversion problems, and based on the geometry of the images, may have problems when attempting to recreate a three-dimensional representation of an object. Moreover, image capture utilizing these techniques is generally effected utilizing a laser. However, due to the laser-assisted image acquisition, context information is generally not available. As such, high-speed three-dimensional data scanners are currently unavailable, which utilize texture information in addition to geometry to perform registration of data sets relative to a common coordinate system. Therefore, there remains a need to overcome one or more of the limitations in the above-described, existing art.

BRIEF DESCRIPTION OF THE DRAWINGS

The various embodiments of the present invention are illustrated by way of example, and not by way of limitation, in the figures of the accompanying drawings and in which:

FIGS. 8A–C depict block diagrams illustrating point cloud assembly incorporating a cumulative misalignment error vector, in accordance with a further embodiment of the present invention.

FIG. 9 depicts a flowchart illustrating a method for performing 3D point cloud assembly, utilizing geometric reference point information, in accordance with the further embodiment of the present invention.

FIG. 10 depicts a flowchart illustrating a method for identifying a portion of overlapping geometry between a first and second point cloud data set, in accordance with a further embodiment of the present invention.

FIG. 13 depicts a flowchart illustrating an additional method for applying a computed transformation to successively align a plurality of point clouds and adjusting the aligned point clouds to compensate for a cumulative, relative misalignment, in accordance with the further embodiment of the present invention.

FIG. 14 depicts a flowchart illustrating an additional method for using texture information to form a transformation and applying the transformation to register a first point cloud relative to a second point cloud, in accordance with a further embodiment of the present invention.

DETAILED DESCRIPTION

A method and apparatus for point cloud assembly are described. In one embodiment, the method includes the obtaining of a data set of a first point cloud and a data set of a second point cloud. Once obtained, a portion of geometry defined by each respective data set is identified, which substantially describes a similar geometric shape. Next, a transformation is computed, such that the portion of geometry in each data set aligns to substantially minimize alignment error. Finally, the computed transformation is applied to the first point cloud to register the first point cloud relative to the second point cloud. In one embodiment, identification of the geometric portion describing a substantially similar geometric shape may be performed utilizing geometric reference point information, image texture information or a combination thereof.

In an embodiment, the methods of the various embodiments of the present invention are embodied in machine-executable instructions. The instructions can be used to cause a general-purpose or special-purpose processor that is programmed with the instructions to perform the methods of the embodiments of the present invention, Alternatively, the methods of the embodiments of the present invention might be performed by specific hardware components that contain hardwired logic for performing the methods, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to one embodiment of the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

3D Scanning System

Figure 1:
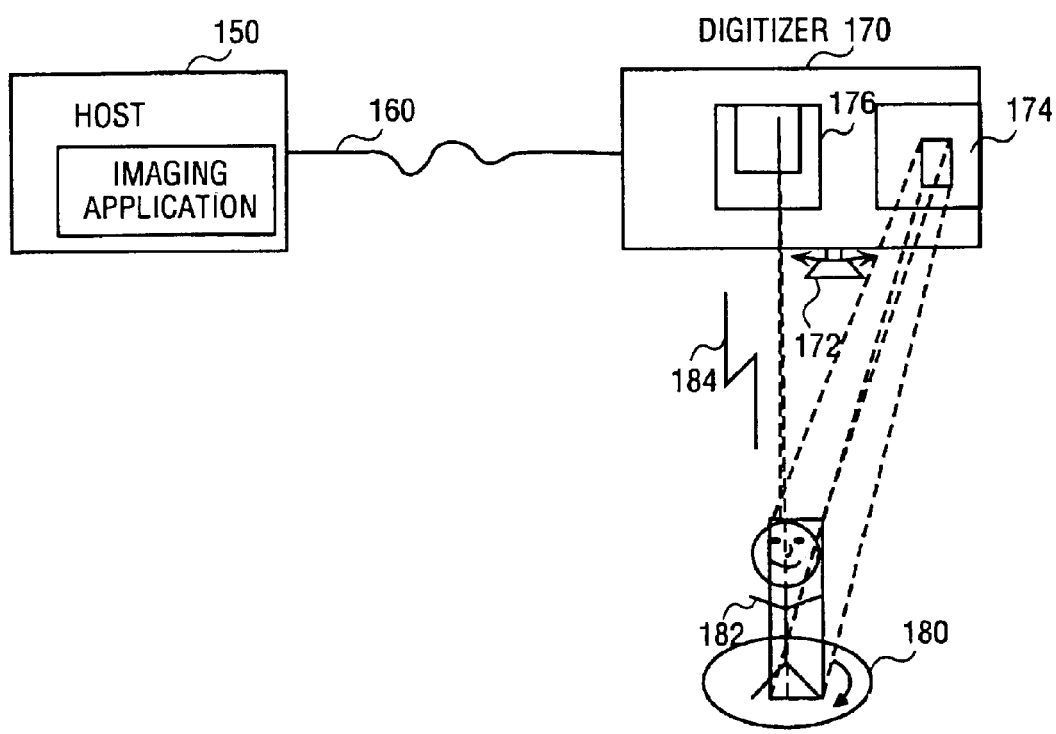
FIG. 1 depicts a block diagram illustrating a computer system configured to implement a 3D scanning system, in accordance with one embodiment of the present invention.

FIG. 1 is a block diagram of a 3D (three-dimensional) scanning system 100 in accordance with one embodiment of the invention. The system 100 includes a host 150 coupled to a digitizer 170 via a wirelink 160. As described in further detail below, the digitizer 170 captures image data that is forwarded to host 150. Host 150 may be a computer (laptop, desktop, hand-held, server, workstation, etc.), an Internet appliance or any other device with sufficient processing power to construct a 3D representation of an image and render the captured image. In this way, the processing on the digitizer 170 may be limited, permitting lower cost construction.

The host 150 may communicate over wire link 160, coupled to a universal serial bus (USB) port of host 150 or via wireless link to the digitizer 170. The digitizer 170 may be any of the myriad noncontact digitizers. One suitable digitizer is described in co-pending patent application Ser. No. 09/660,809, entitled DIGITIZER USING INTENSITY GRADIENT TO IMAGE FEATURES OF THREE-DIMENSIONAL OBJECTS and assigned to the assignee of the instant application.

In one embodiment, the digitizer 170 includes a projector to project a stripe of white light through a projection window 174 onto a remote object such as a person 182 on an orientation fixture 180 remote from the digitizer. The digitizer 170 also contains an image sensing array (ISA) aligned with an image capture window 176 which captures the image of the object 182 within a focal zone. In one embodiment, the ISA is a linear charge coupled device (CCD) or complementary metal oxide semiconductor (CMOS) sensor, and the focal zone is a line on the target object.

In some embodiments, the digitizer 170 includes a base 172 about which the upper unit, including the projector and the ISA, can rotate in either direction. This permits the focal line to be swept back and forth across a target object through an arc. As a result, the sweeping reduces the loss of detail in the captured image that results from shadowing on the object from the perspective of an immobile focal line. Moreover, the digitizer captures texture information, enabling the generation of high resolution 3D images. The digitizer 170 also includes a wireless interface to communicate with the orientation fixture 180 via a wireless link 184.

Orientation fixture 180 may be the type described in co-pending application entitled WIRELESS TURNTABLE, Ser. No. 09/660,810, assigned to the assignee of the instant application. Via wireless link 184, the digitizer sends commands to the turntable 180 and receives from the turntable indications of the angular position of the turntable surface relative to a home position. When the digitizer is activated, it searches for the turntable 180 by sending a signal to which the turntable 180 is required to respond. In some embodiments, the digitizer sends acceleration and rotation profiles to the turntable to control its rotation. Each profile may be retained in firmware on the digitizer 170 or downloaded from host 150.

Generally speaking, the projection portion of the digitizer 170 is retained in fixed relation to the imaging portion. The projection portion produces a light stripe as noted previously on the object 182. By either sweeping the light stripe back and forth through the focal line or by mechanically blocking the stripe at a known rate, the intensity gradient can be created. In one embodiment, the blocking is from 0% to 100% during a cycle. Because the ISA integrates the illumination over time, the outline of a three-dimensional surface is reflected in the data captured by the ISA. This is because protruding features will remain illuminated longer.

Accordingly, more photons are captured by the ISA corresponding to those features. After repeating this process one stripe at a time as the object is rotated by turntable 180 or through the course of sweeping the entire digitizer back and forth as it rotates about the base, cost effective three-dimensional imaging is effected. The digitizer may also be used to capture high resolution scans of two dimensional objects by sweeping back and forth across the object. This feature is particularly desirable in the context of digitizing works of art, as well as enabling stereoscopic techniques.

Figure 2:
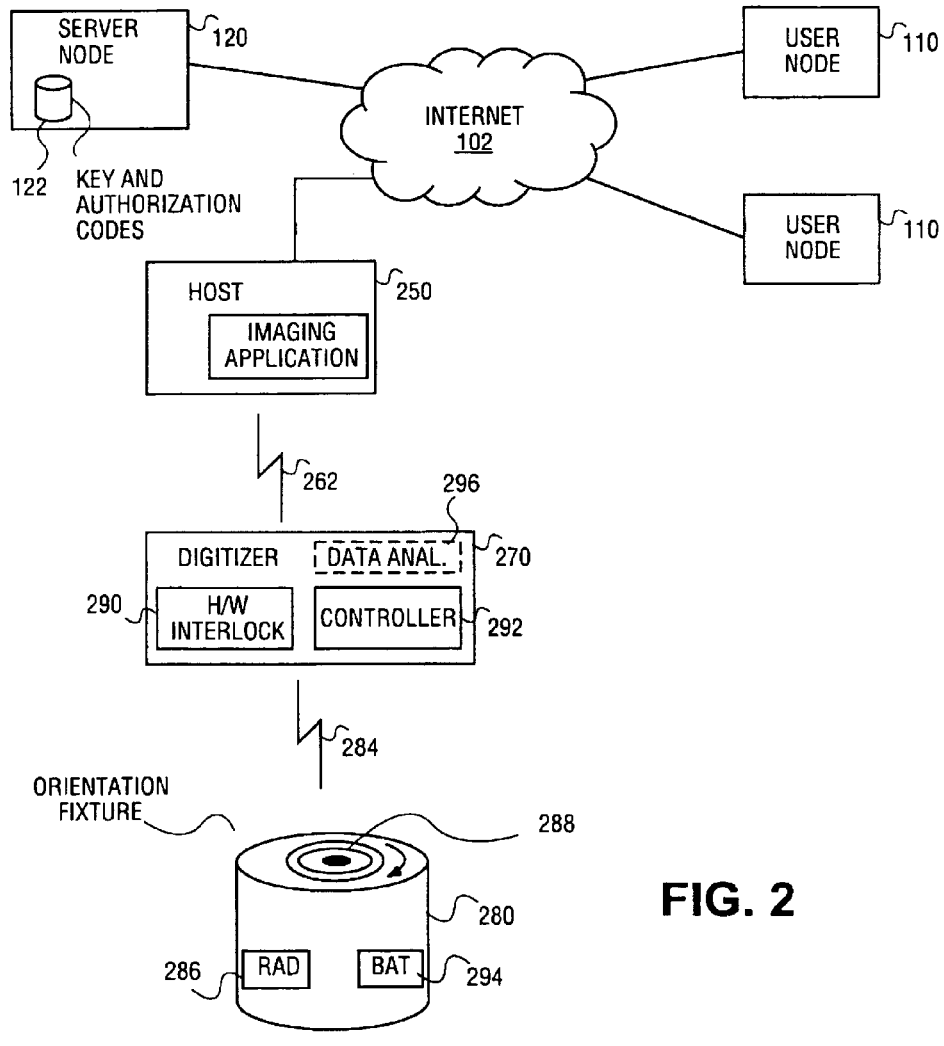
FIG. 2 depicts a block diagram further illustrating the 3D scanning system of FIG. 1, implementing online image access, in accordance with the further embodiment of the present invention.

FIG. 2 is a block diagram of a system of an online 3D scanning system 100 according to one embodiment of the invention. A distributed network 102 such as the Internet provides an interconnection between a plurality of user nodes 110, a server node 120 and a host 250. Server node 120 may be any conventional server or a collection of servers to handle traffic and requests over the distributed network. User nodes may be discrete computers running on their web browser, a corporate network, another server site, or any other node on the distributed network. Host 250 may be a computer (laptop, desktop, hand-held, server, workstation, etc.), an internet appliance or any other device through which data may be forwarded across the distributed network.

In one embodiment, digitizer 270 is physically independent of an orientation fixture 280. For user convenience, it is desirable to minimize space permanently allocated to the system and minimize setup time. Most users will not be able to allocate sufficient space to leave the system configured for use at all times. The user will therefore be required to reintroduce some portion of the system prior to each use. The need to swap cables and otherwise rewire serves as a significant deterrent to wide spread consumer adoption.

Orientation fixture 280 repositions an object to be digitized by digitizer 270 such that different aspects of the object are exposed relative to the digitizer at different points in time. In one embodiment the orientation fixture 280 is a turntable, for example, as depicted with reference to FIG. 1. In addition, the orientation fixture is physically independent of the digitizer. One premise of the system is relative ease of setup to facilitate wide acceptance. Thus, with the physical independence it is desirable that the digitizer 270 and orientation fixture 280 be able to "find" each other.

To that end, the digitizer 270 may be equipped to sweep an area looking with its sensing apparatus for a feature of the orientation fixture 280. The orientation fixture 280 may include a feature such as indicia, for example, acquisition indicia 288, or may contain some other physically observable structure that permits the digitizer to identify and acquire the orientation fixture 280 without the user introducing or removing a separate reference object. In this manner the digitizer settings can be automatically optimized to provide the best available accuracy under existing conditions.

Alternatively, the orientation fixture may have a localized radiation source 286, which permits the digitizer 270 to sweep and identify the location of the orientation fixture based on the localized radiation from radiation source 286. It is also within the scope and contemplation of the invention to have the orientation fixture 270 position itself relative to the digitizer, such that the orientation fixture controls the acquisition by the digitizer 270 of the orientation fixture 280 and the object to be oriented thereby. In the system of such embodiment the orientation fixture would likely be a mobile robotic unit.

In one embodiment, the digitizer communicates with the orientation fixture across a wireless link 284 to coordinate the orientation of the object with image capture by the digitizer. The wireless link may be infrared ("IR"), radio frequency ("RF"), optical signaling, or any other mode of wireless communication. In one embodiment the orientation fixture 280 includes a self contained power source 294 such as a battery. The self-contained power source 194 may also be a solar panel, fuel cell, or any other suitable power source.

Controller 292 in digitizer 270 controls the coordination between the data capture by digitizer 270 and aspect change by the orientation fixture 280. It is within the scope and contemplation of the invention for the controller to reside in the host, the digitizer, the orientation fixture or in an independent unit. In one embodiment, the digitizer 270 may also include a data analyzer 296 that reviews captured data to find errors, anomalies or other points of interest that warrant further investigation, including possibly rescanning the corresponding area. After any corrective action, the data captured by digitizer 270 is passed to the host 250, which renders the three-dimensional model from the data.

The three-dimensional model may then be sent over distributed network 100 to remote nodes such as user nodes 110 or a server node 120. This provides maximum ease of distribution across the distributed network 100. In some cases, control of distribution of information captured by the digitizer is desirable, for example, to facilitate administration of user fees. To that end, in one embodiment the digitizer is provided with a hardware interlock 290 which prevents the system from operating without first receiving authorization. Such authorization may be provided by the server node 120 sending authorization data across the distributed network.

Alternative locking mechanisms such as software or firmware-based locking mechanisms may also be employed either within the digitizer 170 or the host 150. Further security of the system can be affected by requiring an imaging application 152 on the host 150 to provide a valid digital signature in addition to the authorization data before enabling capture and/or transfer of captured data from the digitizer 170 to the host 150.

Figure 3:
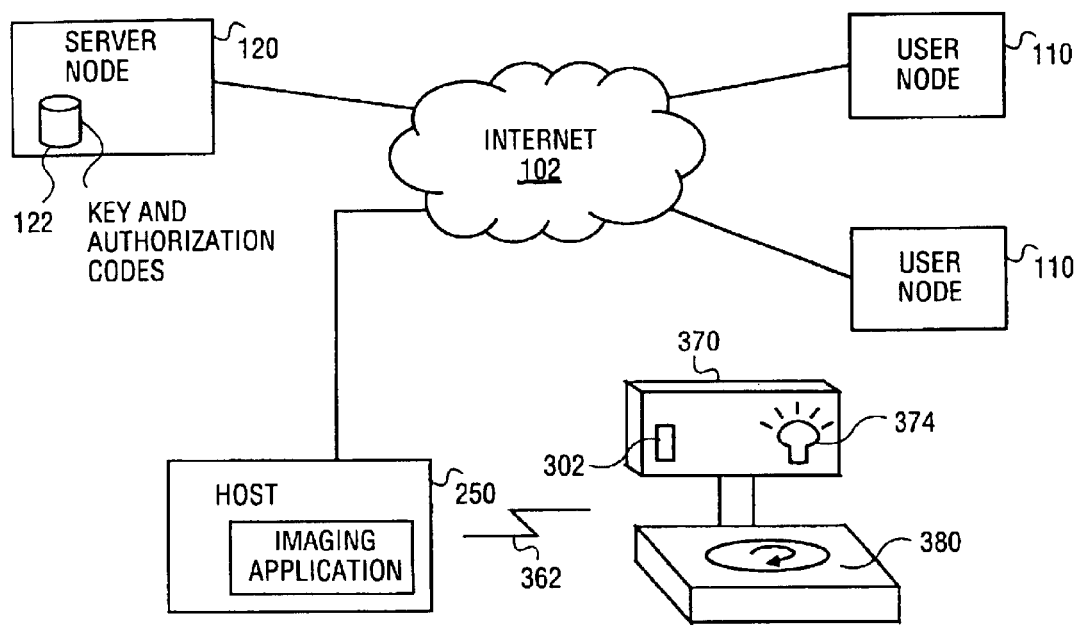
FIG. 3 depicts a block diagram further illustrating the 3D scanning system as depicted in FIG. 1, for enabling online 3D image access, in accordance with the further embodiment of the present invention.

FIG. 3 is a block diagram of an alternative embodiment of the invention. Again, in this embodiment user nodes 110 are coupled to a distributed network 100. Also coupled to distributed node 100 is server node 120 and host 250. However, rather than being physically independent in this embodiment, the digitizer 370 and orientation unit 280 are coupled together to form a single integral unit. The unit communicates with the host by wireless link 362. Alternatively, the unit may be wired to the host by a USB or any other suitable wired communication link. A digitizer may use a linear image sensor 200 to image an object on the orientation fixture 380. A light source 374 may provide the lighting used by the image sensing array to discern the three-dimensional data.

Accordingly, by integrating the digitizer and orientation unit, setup of the system is simplified. The digitizer may be rotatably coupled so that it can sweep its focal zone back and forth across an object positioned by the orientation fixture 380. This embodiment is particular suitable for small-scale objects such as jewelry, in which the desired focal distance is relatively short. The other features discussed above in connection with FIG. 2 may equally be applied to embodiments as shown in FIG. 1.

Figure 4:
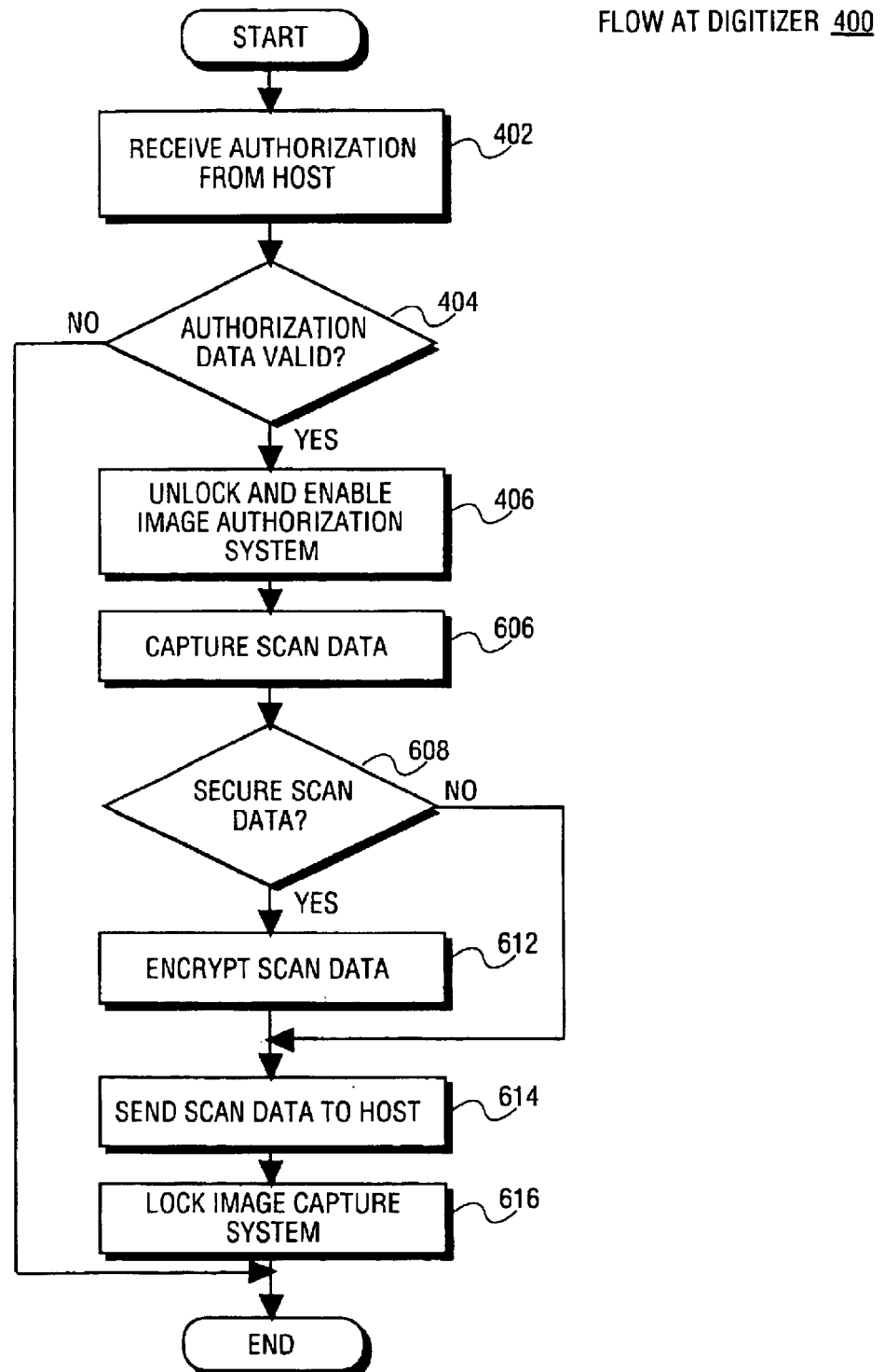
FIG. 4 depicts a flowchart illustrating a method for scanning data, utilizing a digitizer, in accordance with one embodiment of the present invention.

FIG. 4 is a flow diagram of a method 400 for operation of a digitizer in one embodiment of the invention. At process block 402, authorization data is received from the host. The determination is made at process block 404 if the authorization data is valid. If the authorization data is valid, the image capture system is unlocked and enabled at process block 406. At process block 430, the digitizer captures scan data for the object positioned by the orientation fixture. A determination is then made at decision block 432 whether the scan data should be secured. If the scan data should be secured, the digitizer may encrypt the data at process block 434. If the data need not be secured or after encryption, the scan data may be sent to the host at process block 436. At process block 438, the image capture system is relocked.

In one embodiment the server node is able to control both the enablement of the imaging subsystem to operate and to access the data subsequently captured. This permits remote control of a widely distributed network of imaging subsystem having broad user appeal due to low cost and ease of operation.

Figure 5:
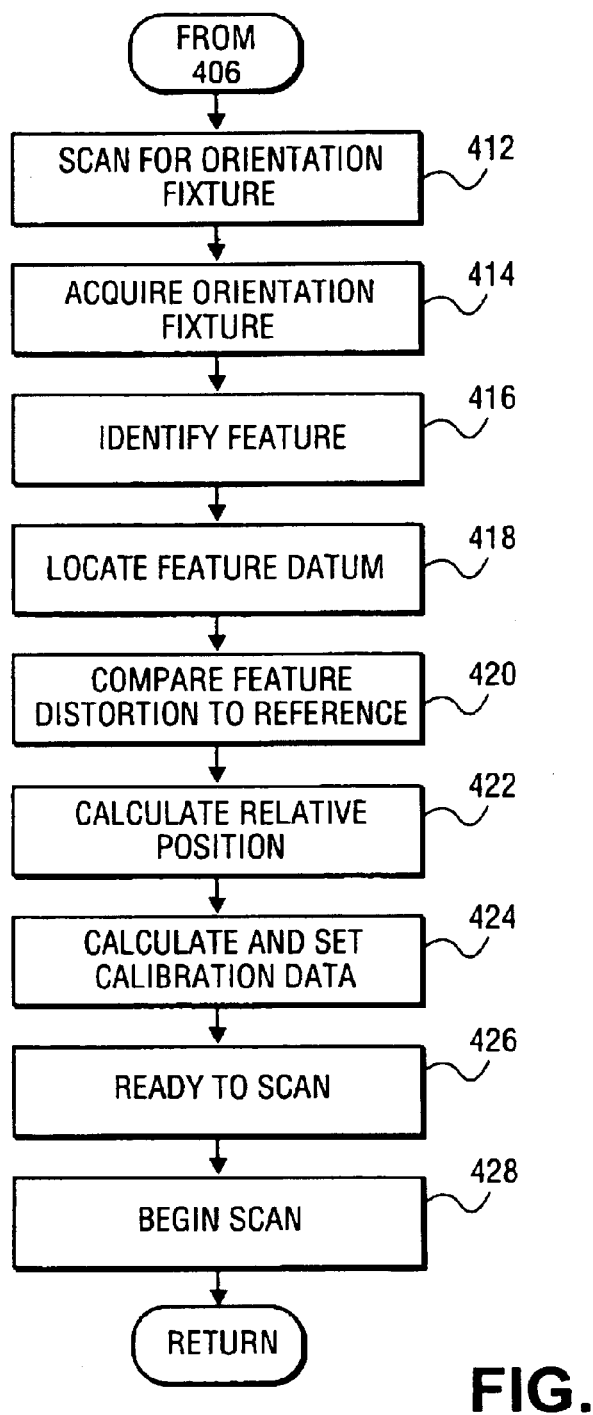
FIG. 5 depicts a flowchart illustrating an additional method for calibrating a digitizer, in accordance with the further embodiment of the present invention.

FIG. 5 is a flow diagram of a method 410 for setup and data capture in a digitizer in one embodiment of the invention. At process block 412, the digitizer scans for the orientation fixture. In one embodiment, this may take the form of the digitizer sweeping an arc around it looking for a distinctive feature. At process block 414, the digitizer acquires the orientation fixture. At process block 416, the digitizer identifies a feature on the digitizer from which it can derive certain information. A featured datum is located at process block 418.

Accordingly, the featured datum provides a reference from which, e.g., the center of the turntable, may be located. At process block 420, feature distortion is compared to a saved reference value, for example, this distortion may either be of the feature or of the entire orientation fixture. Based on this comparison, the relative position is calculated at process block 422. At process block 424, the same distortion can be used to calculate and set calibration data to optimize the accuracy of subsequent scans based on existing conditions. At process block 426, the digitizer becomes ready to scan.

Point Cloud Assembly

Figure 6:
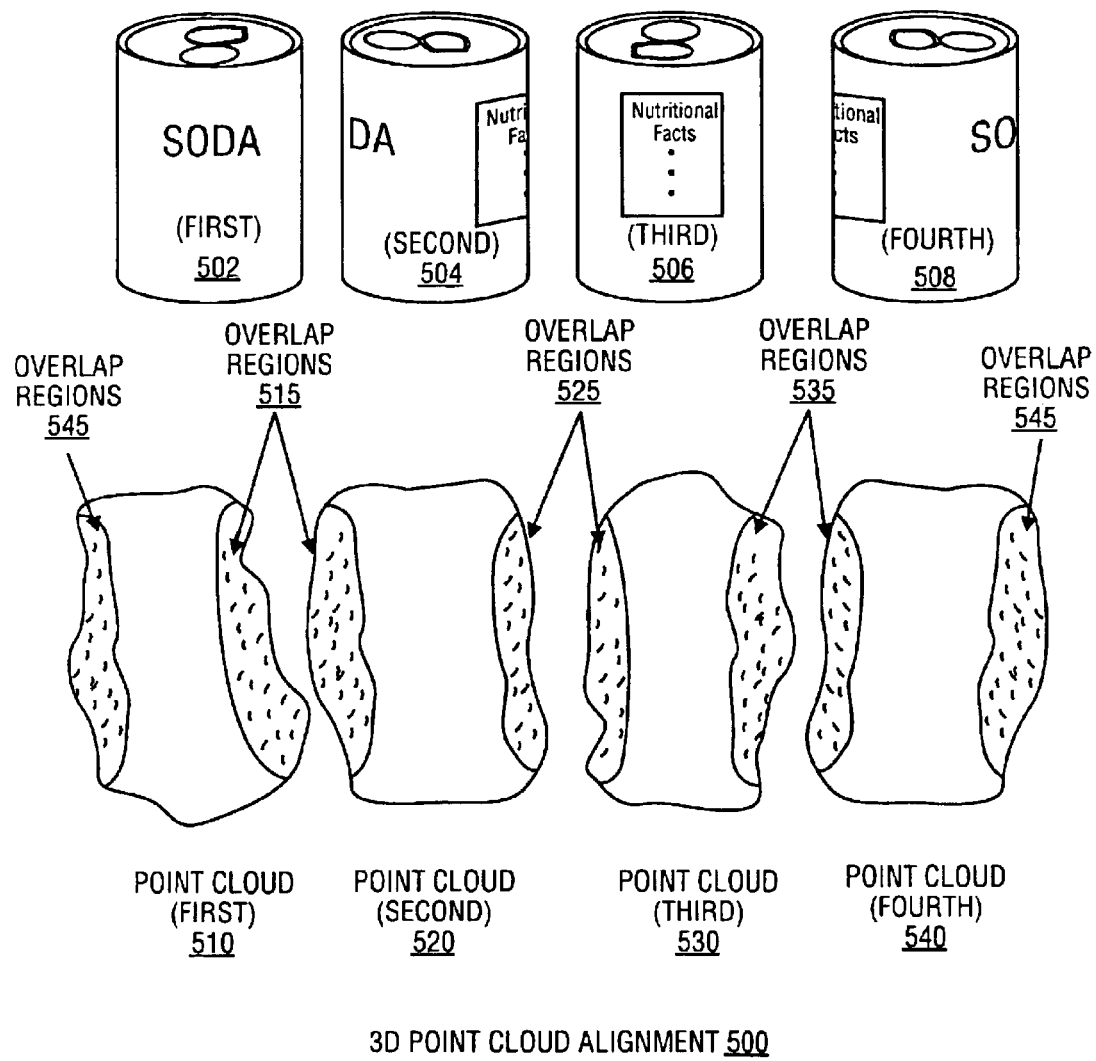
FIG. 6 depicts a block diagram illustrating 3D point cloud assembly and registration, in accordance with a further embodiment of the present invention.

Referring now to FIG. 6, FIG. 6 depicts a block diagram illustrating 3D Point Cloud alignment to perform point cloud assembly in accordance with one embodiment of the present invention. As illustrated, in one embodiment, an object, such as for example, a soda can may be placed upon orientation device 180, for example, as depicted in FIG. 1. As illustrated, a first image 502 of the soda can is captured utilizing, for example, digitizer 170. Next, the soda can is rotated, using turntable 180, to capture a second pan scan 504 of the soda can, and again rotated to capture a third pan scan 506 of the soda can. Finally, the soda can is rotated to capture a fourth pan scan 508 of the soda can as indicated. Utilizing the four aspect images of the soda can, a 3D image of the soda can is generated. In one embodiment, the object (soda can) may remain in a stationary position while digitizer 170 is rotated/adjusted to capture the desired aspect images. In an alternative embodiment, multiple digitizers 170, at various locations, may be utilized to capture the desired aspect images.

Accordingly, the host 150/250 (FIGS. 1–3) is required to generate a model of the image data received from digitizer 170/270/370. Each model's information is stored in, for example, a model database (not shown) and may include, for example, its 3D geometry, a two-dimensional (2D) texture map, model permissions, view definitions, and a light map. The 3D geometry is a set of 3D points that, when connected by lines, form polygons establishing the surface of the physical object. The texture map specifies the surface texture of each polygon in the geometry, while the light map indicates the effect of a light source on the model. In addition, the light map defines both the position of the light source, its brightness, and what the camera sees in reflections.

During model rendering, the texture map is combined with the light map based on each polygon's degree of opacity and reflectivity. The light map can be adjusted to give different effects such as making models of metallic objects appear shiny or dull, or creating sparkles in glass. In one embodiment, the light map is automatically adjusted to improve the visibility of features of interest such as by illuminating the model along the primary viewing axis.

As described above, the digitizer 170 is generally utilized to capture images. However, in order to simplify design of the digitizer, image assembly, as well as image rendering, is generally provided via host 150. Accordingly, the digitizer 170 captures a first pan scan 502, a second pan scan 504, a third pan scan 506, and a fourth pan scan 508, and generates a point cloud for each captured perspective (510, 520, 530 and 540) which are provided to host 150. As known to those skilled in the art, a point cloud generally refers to a three-dimensional distribution of points usually representing measured or computed values of some physical property such as, for example, a three-dimensional object.

As illustrated with reference to FIG. 6, the 3D scanning system 100 can operate in a modified sterographic image mode. Under this mode, the system uses the turntable 180 under the digitizers control to present a plurality of aspects or pan scans of an object to the digitizer 170/270/370. As illustrated, the four pan scans of a soda can are captured: first pan scan 502, second pan scan 504, third pan scan 506 and fourth pan scan 508. By capturing two-dimensional images of each desired aspect using, for example, the ISA described above, very high resolution pictures are created. Accordingly, these high resolution pictures may be used to construct a three-dimensional image following known stereoscopic techniques.

Unfortunately, when several aspects or pan scans of an object are captured, the resulting 3D point clouds generated from the image capture of the object must be reassembled in order to enable creation of a 3D geometry of the object to enable image rendering. The assembly is generally performed by calculating a transformation that is applied to one of the point clouds in order to align the overlapping regions and assemble the pan scans into a 3D geometry of the object. For example, a transformation is required that aligns overlapping regions of each of the point clouds in order to assemble the point clouds (510, 520, 530 and 540).

Unfortunately, the techniques discussed above are limited to improving initial position and orientation estimates between two data sets. For example, given two sets of data and an initial estimate of their relative positions, the ICP algorithm is used to register the data sets by improving the initial position and orientation estimate. In other words, the ICP algorithm iteratively registers a floating (i.e., data) surface towards a reference (i.e., model) surface. Additionally, ICP will produce an erroneous resort where no overlap exists in the data sets.

However, the ICP algorithm is an iterative algorithm requiring correspondence between each respective pair of points within the two data sets to form transformation which minimizes the mean square error (MSE) of the correspondences, an extremely time-consuming process. Moreover the ICP algorithm may fail to converge when processing an image of a symmetric object, due to the closest point operation, which returns, for a given query point, the point on the reference surface that is closest to the query point. Additionally, ICP will produce an erroneous result where no overlap exists in the data sets.

Consequently, utilization of the ICP algorithm to enable image rendering within the 3D scanning system described by the embodiments of the present invention is not feasible. As indicated above, the 3D scanning system should provide ease of use which includes substantially real time image acquisition and rendering which cannot be accomplished utilizing the ICP algorithm. In contrast, a closed form solution or algorithm is available, which is utilized for defining the relationship between two coordinate systems using pairs of measurements of the coordinates of a number of points in both systems (see B. K. P. Horn, "Closed Form Solution of Absolute Orientation Using Unit Quaturnians", J. Opt. Soc. AMA/Volume 4, April 1987) ("Horn Algorithm"). Unfortunately, the Horn Algorithm also requires correspondence between each respective pair of points within the two systems.

As indicated by the Horn Algorithm, the photogrametric problem of recovering the transformation between coordinates of a number of points as measured in two different Cartesian coordinate systems is referred to as "absolute orientations". Accordingly, the Horn Algorithm assumes that there is a correspondence between each point within two received data sets. Consequently, the Horn Algorithm would yield an erroneous transformation when all data is supplied to the Algorithm, but only a portion of the data sets overlap.

Figure 7A:
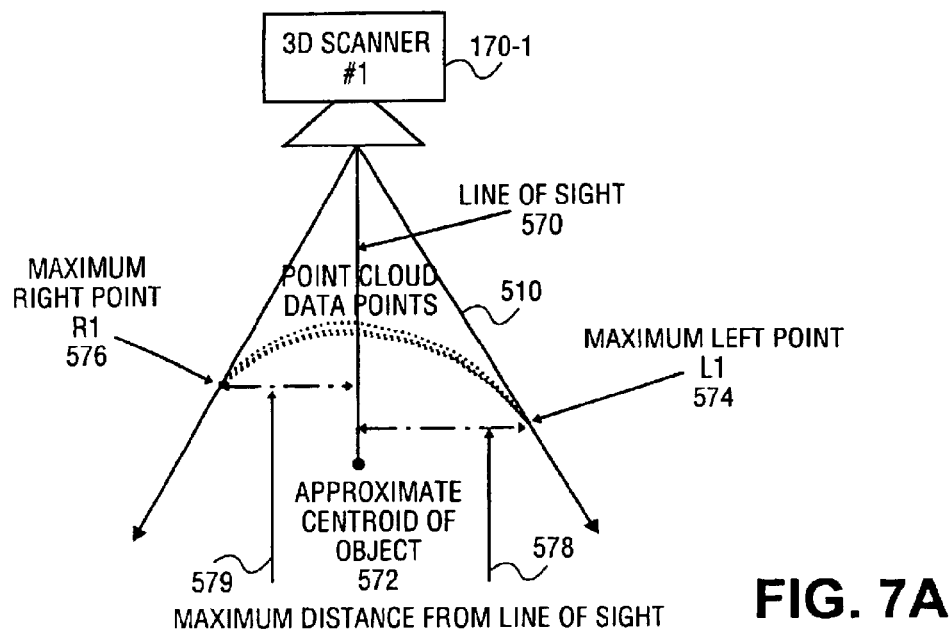
FIGS. 7A and 7B depict block diagrams illustrating overlap region detection, in accordance with one embodiment of the present invention.

Therefore, in accordance with one embodiment of the present invention, for example, as depicted with reference to FIG. 7A, overlapping regions between a pair of point clouds are first determined. In one embodiment, the overlapped regions are determined, as depicted with reference to FIG. 7B. Once determined, points corresponding to a first point cloud that are contained within the overlap region form a first data set. Likewise, points belonging to a second point cloud, which fall within the overlap region, form a second data set. As such, once the first and second data sets are determined, the first and second data sets may be processed, according to the Horn Algorithm, in order to obtain a transformation therebetween using the following equations:

Let there be n points. The measured coordinates in the left and right coordinate system will be denoted by $$\{r_{l,i}\} \text{ and } \{r_{r,i}\}, \tag{1}$$

respectively, where i ranges from 1 to n.

It turns out to be useful to refer all measurements to the centroids defined by:

$$\bar{r}_l = \frac{1}{n}\sum_{i=1}^{n} r_{l,i}, \bar{r}_r = \frac{1}{n}\sum_{i=1}^{n} r_{r,i} \tag{2}$$

Let us denote the new coordinates by $$r'_{l,i}=r_{l,i}-\vec{r}_l, r'_{r,i}=r_{r,i}-\vec{r}_r. \tag{3}$$

Note that $$\sum_{i=1}^{n} r'_{l,i} = 0, \sum_{i=1}^{n} r'_{r,i} = 0. \tag{4}$$

It is convenient at this point to introduce the 3×3 matrix $$M = \sum_{i=1}^{n} r'_{l,i} r'^{T}_{r,i} \tag{5}$$

whose elements are sums of products of coordinates measured in the left system with coordinates measured in the right system. It turns out that this matrix contains all the information required to solve the least-squares problem for rotation. We may identify the individual elements by writing M in the form $$M = \begin{bmatrix} S_{xx} & S_{xy} & S_{xx} \\ S_{yx} & S_{yy} & S_{yz} \\ S_{zx} & S_{zy} & S_{zz} \end{bmatrix}, \tag{6}$$

where $$S_{xx} = \sum_{i=1}^{n} x'_{l,i} x'_{r,i}, \; S_{xy} = \sum_{i=1}^{n} x'_{l,i} y'_{r,i}, \tag{7}$$

and so on. Then $$N = \begin{bmatrix} (S_{xx}+S_{yy}+S_{zz}) & S_{yz}-S_{zy} & S_{zx}-S_{xz} & S_{xy}-S_{yx} \\ S_{yz}-S_{zy} & (S_{xx}-S_{yy}-S_{zz}) & S_{xy}+S_{yx} & S_{zx}+S_{xz} \\ S_{zx}-S_{xz} & S_{xy}+S_{yx} & (-S_{xx}+S_{yy}-S_{zz}) & S_{yz}+S_{zy} \\ S_{xy}-S_{yx} & S_{zx}+S_{xz} & S_{yz}+S_{zy} & (-S_{xx}-S_{yy}+S_{zz}) \end{bmatrix} \tag{8}$$

Thus the 10 independent elements of the real symmetric 4×4 matrix N(8) are sums and differences of the nine elements of the 3×3 matrix M. As such, the Horn Algorithm begins by calculating centroids of two sets of measurements in a left and a right coordinate system (Equation 2). Once calculated, the centroids are subtracted from all measurements so that subsequent analysis deals with measurements relative to the centroids (Equation 3). In other words, subtraction of the centroids converts the point clouds from a global coordinate system to a local coordinate system.

Next, for each pair of coordinates, nine possible coordinate products of the components of the two vectors are computed (Equation 6). These products are then added to obtain $S_{xx}$, $S_{xy}$, . . . $S_{zz}$ (Equation 7). These nine totals contain all the information that is required to find the solution to the symmetric matrix (8). Next, ten independent elements of a 4×4 symmetric matrix N ("Horn Matrix") (8) are computed by combining the sums obtained above, as illustrated in Equation 8. From these elements, coefficients are calculated from the fourth order polynomial that has to be solved to obtain the eigenvalues (λ) of matrix N. Using the eigenvalues, the unit quaternion representing the best rotation is the eigenvector associated with the most positive eigenvalue.

Unfortunately, the Horn Algorithm fails to describe how to solve the Horn Matrix (8). Moreover, the Horn Algorithm assumes a correspondence between each point within each point cloud exists. Consequently, when this assumption is broken, the Horn Algorithm may converge to an erroneous result.

In contrast, embodiments of the present invention are directed toward assembly of a plurality of aspect images, or pan scans, of an object, which are reassembled in order to generate a 3D geometry of an object. In the embodiments described in further detail below, 3D geometry, as well as image texture, or a combination therebetween, may be utilized in order to determine overlapping regions of two point clouds. Once determined, the overlapping regions are processed to determine a transformation matrix to register overlap regions of the point clouds and assemble the point clouds.

Accordingly, one embodiment of the present invention utilizes camera location, as well as a projection angle, to determine overlapping regions 515, 525, 535 and 545, as depicted in FIG. 6. For example, as depicted with reference to FIGS. 7A and 7B, block diagrams illustrate image capture of an object utilizing two pan scans or image aspect views (510 and 520). As illustrated, the location and camera angles used to capture the pan scans are known locations. In various embodiments, the object may be rotated to capture various aspects. Alternatively, multiple cameras may be used at various locations to capture the desired pan scans. Based on these locations, a global centroid for the object may be determined. Once determined, extrema for the first point cloud 510 and the second point cloud 520 are detected.

For example, as illustrated with reference to FIG. 7A, a line of sight 570 is initially determined between the global centroid 572 and an initial camera reference location 170-1. Once the line of sight 570 is determined, a pair of opposed points (574 and 576) from the first point cloud 510 are determined that have a maximum distance from the line of sight 570. In one embodiment, a maximum left point (L15) 574 is determined, while a maximum right point (R1) 576 is determined (left and right based on camera point of view). As illustrated, these points have a maximum distance from the line of sight 570, as indicated, 578 and 579.

Once the first opposed pair of points (574 and 576) in the first point cloud 510 are determined, a second line of sight 580 is determined between the global centroid 572 and the subsequent camera reference location 170-2 to the object are used to capture the second point cloud 520. In one embodiment, the object is rotated to capture the second pan scan 504. Once determined, the process is repeated wherein a second opposed pair of points (584 and 588) from the second point cloud 520 are determined, which have a maximum distance from the line of sight 580. Subsequently, a point (574) from the first pair of opposed points, having a minimum distance from the second line of sight 580 is selected. Next, a point (586) from the second opposed pair of points, having a minimum distance from the first line of sight 570, is selected.

In one embodiment, as illustrated with reference to FIG. 7B, point L1 574 is initially selected, due to the fact that point L1 574 is closer to line of sight 580 than point R1 576. Once selected, point R2 586 is selected, since it is closer to first line of sight 570 than point L2 584. Using these points, the region of overlap 540 is determined according to an area defined by the global centroid 572, point R2 586 and point L1 574. As such, points within the first point cloud 510 and the second point cloud 520, which fall within the overlap region area 540, are selected. In one embodiment, the maximum points are switched when the second point cloud 520 is selected as the point cloud assembly anchor.

As indicated above, the Horn Matrix requires one-to-one correspondence between points provided for transformation calculation. Therefore, by using overlap region 515, one embodiment of the present invention ensures one-to-one correspondence between the points contained within the overlap region. Consequently, the overlap region detection, as depicted with reference to FIGS. 7A and 7B, is repeated for each pair of point clouds, which have the corresponding overlap region. As such, the process is repeated to determine overlap regions 525, 535 and 545. In addition, this process may be repeated when successive point clouds are aligned in order to determine a cumulative misalignment of the various point clouds to generate an error vector, which is incorporated into the global transformation matrix (see Equation 19).

Once the overlapping regions (515, 525, 535 and 545) are determined, points within the overlapping region points are processed to calculate transformations, which will align the overlapping regions when applied to the point clouds in order to assemble point clouds 510–540, as depicted in FIGS. 6–8C. The identification of the overlapping regions reduces the search area to identify correspondences between the data sets. This significantly reduces processing time required to establish the correspondences. Consequently, a transformation for the overlapping regions is quickly calculated, which can be utilized and applied to each point within the point clouds in order to register the point cloud images and assemble a 3D geometry of a desired object in substantially real time.

Therefore, by determining overlapping regions (515, 525, 535 and 545) using camera location and projection angle, one embodiment of the present invention drastically reduces the number of points which are processed in order to determine a transformation between the set of points, while ensuring one-to-one correspondence between the points. The calculation of rotation, translation, scale and for the overlap regions are calculated as follows to enable point cloud assembly according to one embodiment of the invention.

To assemble point clouds, an anchor is first selected. In this case, the first point cloud 510. A local transformation may then be calculated between the first and second point cloud 510, 520. After application of the transformation to the second point cloud 520, the two point clouds are registered and form a single combined or aggregate point cloud. In one embodiment, to align a third point cloud 530 with the combined point cloud requires a matrix multiplication of the local transformation (described below) between the second and third point cloud 520, 530 and a global transformation matrix. The global transformation matrix for the $i^{th}$ registration is given by the equation:

$$T_{mG_i} = I(T_{mL_0} \cdot T_{mL_1} \ldots T_{mL_{i-1}}) \quad (9)$$

where I is the identity matrix and $T_{mL_N}$ is the local transformation matrix for the N+1$^{th}$ registration.

Based on the Horn Matrix (N) (8), a most positive eigenvalue ($\lambda$) must be determined in order to determine a unit quaternion eigenvector ($\vec{V}$) such that $$\lambda N = \vec{V}\lambda \quad (10)$$

where $$\vec{V} = q0 + q_x + q_y + q_z \quad (11)$$

In one embodiment, the unit quaternion $\vec{V}$ is determined using Householder Reduction. However, in order to form a rotation matrix ($R_m$), the elements unit quaternion (10) are processed as follows:

$$R_m = \begin{bmatrix} (q_0^2 + q_x^2 - q_y^2 - q_z^2), & 2(q_x q_y - q_o q_z), & 2(q_x q_z + q_o q_y) \\ 2(q_y q_x + q_o q_z), & (q_o^2 - q_x^2 + q_y^2 - q_z^2), & 2(q_y q_z - q_o q_y) \\ 2(q_z q_x - q_o q_y), & 2(q_z q_y - q_o q_y), & (q_o^2 - q_x^2 + q_y^2 - q_z^2) \end{bmatrix} \quad (12)$$

Next, the scale (S) is calculated as the ratio of the root-mean square deviations of the coordinates of the overlapping portion of the two point clouds from their respective centroid using the following equation:

$$s = \frac{\sum_{i=1}^{n} r'_{r,i} \cdot R(r'_{l,i})}{\sum_{i=1}^{n} \|r'_{l,i}\|^2} \quad (13)$$

Once the scale is determined, the rotation matrix is augmented by the scale to form an augmented rotation matrix:

$$AR_m = \begin{bmatrix} R_{m1,1} \cdot S & R_{m1,2} \cdot S & R_{m1,3} \cdot S \\ R_{m2,1} \cdot S & R_{m2,2} \cdot S & R_{m2,3} \cdot S \\ R_{m3,1} \cdot S & R_{m3,2} \cdot S & R_{m3,3} \cdot S \end{bmatrix} \quad (14)$$

Next, the translation vector ($\vec{T}$) is calculated by first determining a transformed left centroid ($\vec{T}_{LC}$) as follows:

$$\vec{T}_{LC} = (AR_m \cdot LC) \quad (15)$$

where LC is the left centroid of the left point cloud. Once the ($\vec{T}_{LC}$) is determined, the final translation vector ($\vec{T}$) is calculated as:

$$\vec{T} = \vec{RC} - \vec{T}_{LC} \quad (16)$$

Using the augmented rotation matrix ($AR_m$) and the translation vector ($\vec{T}$), a 4×4 homogenous coordinate transformation matrix ($T_m$) for registering a first point cloud relative to a second point cloud is calculated as follows:

$$T_m = \begin{bmatrix} R_{m1,1} \cdot S & R_{m1,2} \cdot S & R_{m1,3} \cdot S & T_x \\ R_{m2,1} \cdot S & R_{m2,2} \cdot S & R_{m2,3} \cdot S & T_y \\ R_{m3,1} \cdot S & R_{m3,2} \cdot S & R_{m3,3} \cdot S & T_z \\ 0 & 0 & 0 & 1 \end{bmatrix} \quad (17)$$

However, in order to reduce point cloud assembly errors, an error vector is determined ($\vec{EV}$) 560 between a first point cloud and an $N^{th}$ point cloud as depicted in FIG. 8B. As illustrated with reference to FIGS. 8A–8C, FIGS. 8A–8C illustrate the assembly of the pan scans of the soda can, as depicted in FIG. 6. As illustrated, an initial or first pan scan 510 is anchored as a reference point. Accordingly, pan scans, or point clouds (520 and 540) are adjusted relative to pan scan 510. However, such an assembly will lead to a error vector ($\vec{EV}$) 550 (FIG. 8B) between pan scan 540 and pan scan 510.

Figure 7B:
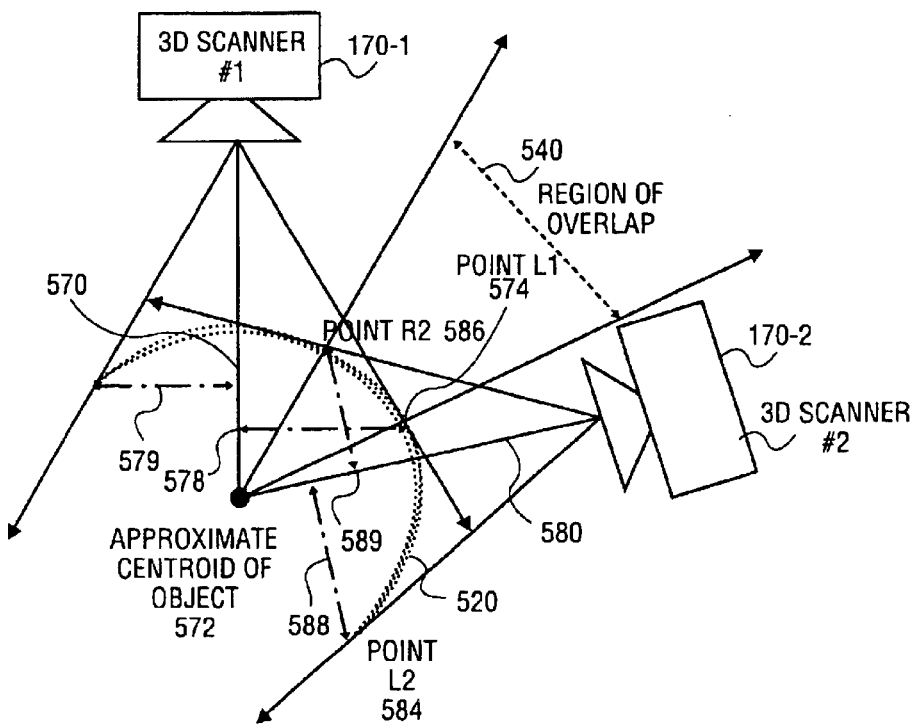

Consequently, utilizing the overlap region calculation as depicted with reference to FIGS. 7A and 7B, an initial overlap region calculation between pan scan 540 and pan scan 510 may be compared to an overlap region therebetween once pan scan 540 is assembled with reference to pan scans 530, 520 and 510. By comparing the overlapping regions, an error vector ($\vec{EV}$) can be determined as indicated by the following equation:

$$\vec{EV} = (\Delta_x, \Delta_y, \Delta_z) \quad (18)$$

Accordingly, the transformation matrix is updated as follows:

$$T_{mG} = \begin{bmatrix} R_{m1,1} \cdot S & R_{m1,2} \cdot S & R_{m1,3} \cdot S & T_x + \frac{\Delta_x}{N-1} \\ R_{m2,1} \cdot S & R_{m2,2} \cdot S & R_{m2,3} \cdot S & T_y + \frac{\Delta_y}{N-1} \\ R_{m3,1} \cdot S & R_{m3,2} \cdot S & R_{m3,3} \cdot S & T_z + \frac{\Delta_z}{N-1} \\ 0 & 0 & 0 & 1 \end{bmatrix} \quad (19)$$

(where N is the number of point clouds to be registered.)

Therefore, as depicted with reference to FIG. 8B, the translation error vector ($\vec{EV}$) may be distributed to assembly of each point cloud, as illustrated with reference to FIG. 8C, in order to uniformly distribute the error vector ($\vec{E}$), where $\Delta_x$, $\Delta_y$, and $\Delta_z$, indicated the 3D magnitude of the $\vec{EV}$ in the x-axis, y-axis and z-axis.

Referring again to the point cloud alignment 500, as depicted in FIG. 6, the embodiment described depicts image capture utilizing a first, second, third and fourth view or pan scans of an object. However, those skilled in the art will recognize that various aspect views or pan scans of an object may be taken as required to effectively generate a 3D geometry of the object. Accordingly, based on the complexity of the object, additional aspect images of the object may be required in order to properly create a 3D representation or geometry of the desired object. Likewise, calculation and distribution of the error vector may be easily applied to as many desired pan scans as required to capture the image.

Consequently, each generated image aspect will result in a generated point cloud, for example, point clouds 510–540 as depicted in FIG. 6. As such, image alignment and assembly, as well as $\vec{EV}$ distribution, are performed for each pair of point clouds containing overlapping regions. In other words, assuming N aspect images (that each contain unique information) are taken of an object, N−1 point cloud alignments and assembly are required in order to generate a 3D geometric representation of the object. However, by determining the error vector ($\vec{EV}$) 550 (see FIG. 8B) and incorporating the error vector into a global transformation matrix, the EV is distributed as depicted in FIG. 8C to form point cloud assembly 555. Therefore, by precalculating the error vector, one embodiment of the invention incorporates the error vector into the $T_{mG}$ matrix, such that the $\vec{EV}$ is incorporated into each point cloud assembly.

The foregoing description has largely assumed that the first point cloud will be used as the anchor and each successive point cloud will be aligned relative to the first. In an alternative embodiment, the anchor is chosen as the point cloud having the greatest overlap with its neighboring point clouds. Then, successive registration proceeds to the most overlapping point cloud of the neighbors of the combined point cloud. For illustration, Table 1 reflects the exemplary overlap between the respective point clouds of FIG. 6:

TABLE 1

| POINT CLOUD | OVERLAP-NEIGHBOR | TOTAL |
| --- | --- | --- |
| 1 | 500 points - 2 | 1,500 |
|   | 1,000 points - 4 |   |
| 2 | 500 points - 1 | 700 |
|   | 200 points - 3 |   |

TABLE 1-continued

| POINT CLOUD | OVERLAP-NEIGHBOR | TOTAL |
|---|---|---|
| 3 | 200 points - 2<br>800 points - 4 | 1,000 |
| 4 | 800 points - 3<br>1,000 points - 1 | 1,800 |

In this example, point cloud 4 (the point cloud with the greatest total overlap) will be selected as the anchor and will initially be aligned with point cloud 1 (its most overlapping neighbor). The global transformation matrix (see Equation 9) will be generated and point cloud 3 will be aligned with the combined point cloud resulting from the alignment of point clouds 1 and 4. Finally, point cloud 2 (the cloud with the least overlap) is registered with the aggregate of 1, 3 and 4.

Referring now to FIG. 9, FIG. 9 depicts a flowchart illustrating a method 600 for point cloud assembly utilizing geometric position information within a 3D scanning system, for example, as depicted in FIGS. 1–3. At process block 602, a data set of a first point cloud and a data point of a second point cloud are obtained. Once obtained, at process block 604, a portion of geometry defined by each respective data set is identified, which describes a substantially similar geometric object. Next, a transformation is computed, such that the portion of geometry in each data set is aligned to substantially minimize alignment error. Finally, at process block 650, the transformation is applied to the first point cloud to register it relative to the second point cloud.

For example, as depicted with reference to FIGS. 6, 7A and 7B, process block 604 determines overlapping regions 515 of point cloud 510 and 520, utilizing, for example, camera location information, as well as camera angle information, as depicted with reference to FIGS. 7A and 7B. Once this information is determined, the transformation of process block 620 is computed (see Equations 16 and 18), utilizing the points within the determined overlapping regions. Consequently, by limiting calculation of the transformation to the points within the overlapping regions, the time required to calculate the transformation is reduced. Accordingly, the transformation can be applied to the first point cloud to register it relative to the second point cloud in order to align overlapping regions in order to assemble the point clouds. Consequently, by reducing the time required to calculate the transformation, a 3D representation of an object is generated in substantially real time.

Referring now to FIG. 10, FIG. 10 depicts a flowchart illustrating an additional method 610 for identifying the portion of geometry defined by each respective data set, which describes a substantially similar geometric shape of process block 604, as depicted in FIG. 9. At process block 612, a spatial relation of an image capture device, which captures at least one of the data sets with respect to an object represented in the data sets, is obtained. Finally, at process block 614, overlapping regions of the first point cloud and the second point cloud are determined according to the spatial relations information in order to detect the portion of geometry defined by each respective data set, which describes a substantially similar geometric shape. In one embodiment, this is performed as depicted with reference to FIG. 7B.

As illustrated with reference to FIGS. 7A and 7B, the locations of the various camera positions utilized to generate the point clouds enables the calculation of an overlap region between the point clouds. Once this overlap region is determined, points falling within the area of the first point cloud and points falling within the area of the second point cloud are utilized and provided in order to calculate the 3D transformation matrix (16) and (18). As indicated, the number of points within the overlapping regions is substantially less than the amount of points which comprise each of the point clouds. Consequently, by limiting the amount of points for which a transformation is determined, one embodiment of the present invention enables point cloud assembly within real time, enabling real time 3D scanning systems.

Alternatively, the overlap region between the first and second point clouds may be determined utilizing texture information. By capturing texture information, such techniques including edge detection, and the like, can be utilized to determine the overlapping region. Once the overlapping region is determined, in one embodiment, pixels depicting the overlapping regions may be mapped to a corresponding 3D geometry. From this 3D geometry, each corresponding point of the 3D geometry represents the desired overlapping image data, which is then utilized to calculate a transformation, which can be applied to each point within the first cloud to register it relative to the second point cloud.

Figure 11:
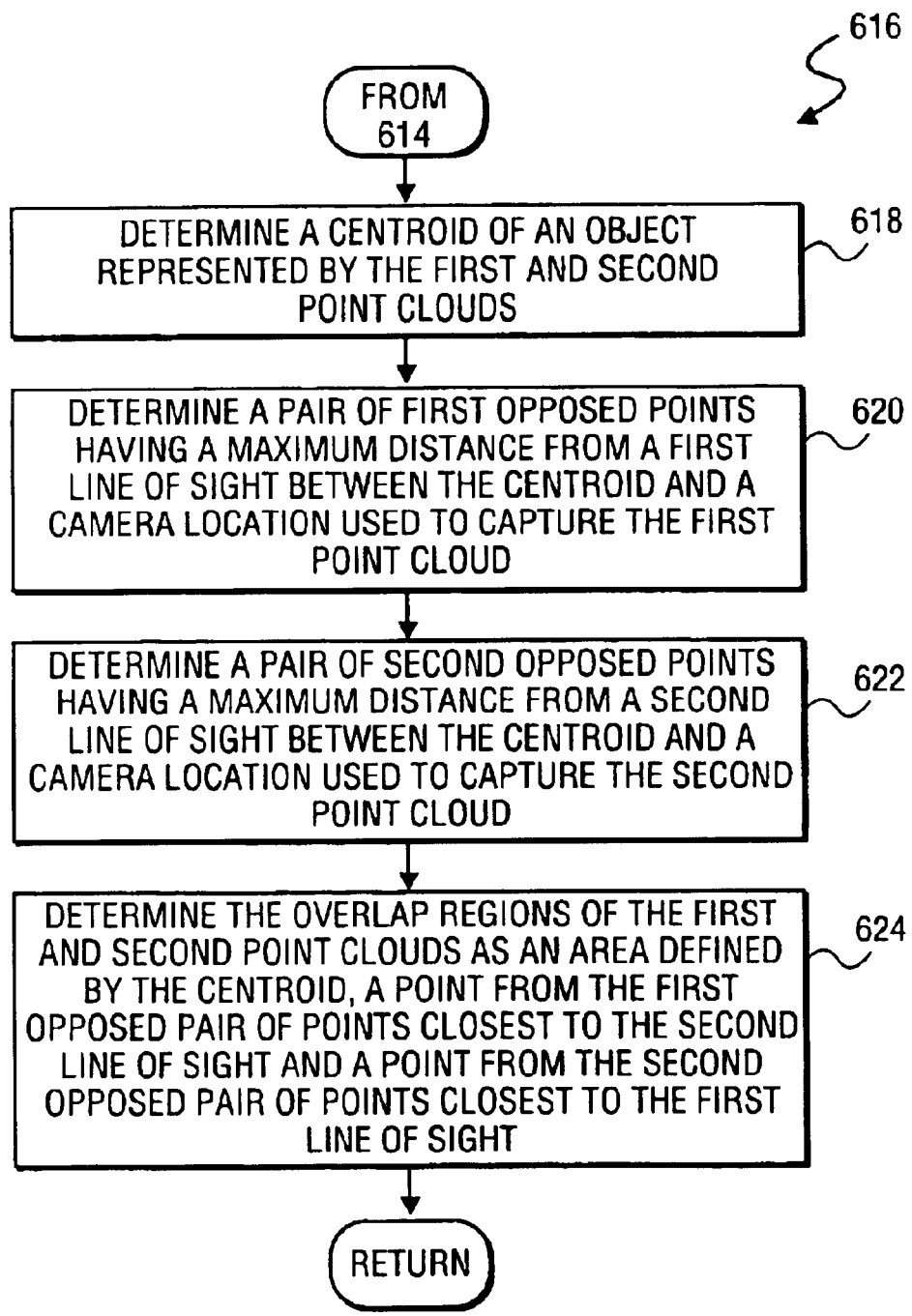
FIG. 11 depicts a flowchart illustrating an additional method for identifying a portion of overlapping geometry between a first and second point cloud data set, in accordance with a further embodiment of the present invention.

Referring now to FIG. 11, FIG. 11 depicts a flowchart illustrating an additional method 616 for detecting an overlap region, for example, as depicted with reference to FIGS. 7A and 7B, in accordance with a further embodiment of the present invention. At process block 618, a centroid 572 of an object represented by the first 510 and second 520 point clouds is determined. Once determined, at process block 620, a pair of first opposed points (574 and 576), having a maximum distance from a line of sight 570 between the centroid 572 and a camera location 1701 used to capture the first point cloud 510, is determined. Once determined, a pair of second opposed points (584 and 586), having a maximum distance from a second line of sight 580 between the global centroid 572 and a camera location 170-2 used to capture the second point cloud 520, are determined.

Using the first and second opposed pair of points, at process block 622, the portion of geometry defined by each respective data set, which describes a substantially similar geometric shape, or overlap region 515, is determined. As illustrated by process block 622, an area defined by the centroid 572, a point 574 from the first opposed pair (574 and 576) of points closest to the second line of sight 580 and a point 586 of the second opposed pair of points (584 and 586) closest to the first line of sight 570 forms the overlap region 540. As illustrated with reference to FIG. 7B, overlap region 540 is determined by using point R2 586, point L1 574 and global centroid 572. As such, the transformation calculation is limited to points contained within the overlap region, which drastically reduces calculations of the 3D transformation, as well as a 3D geometry of an object represented by the first and second point clouds.

Figure 12:
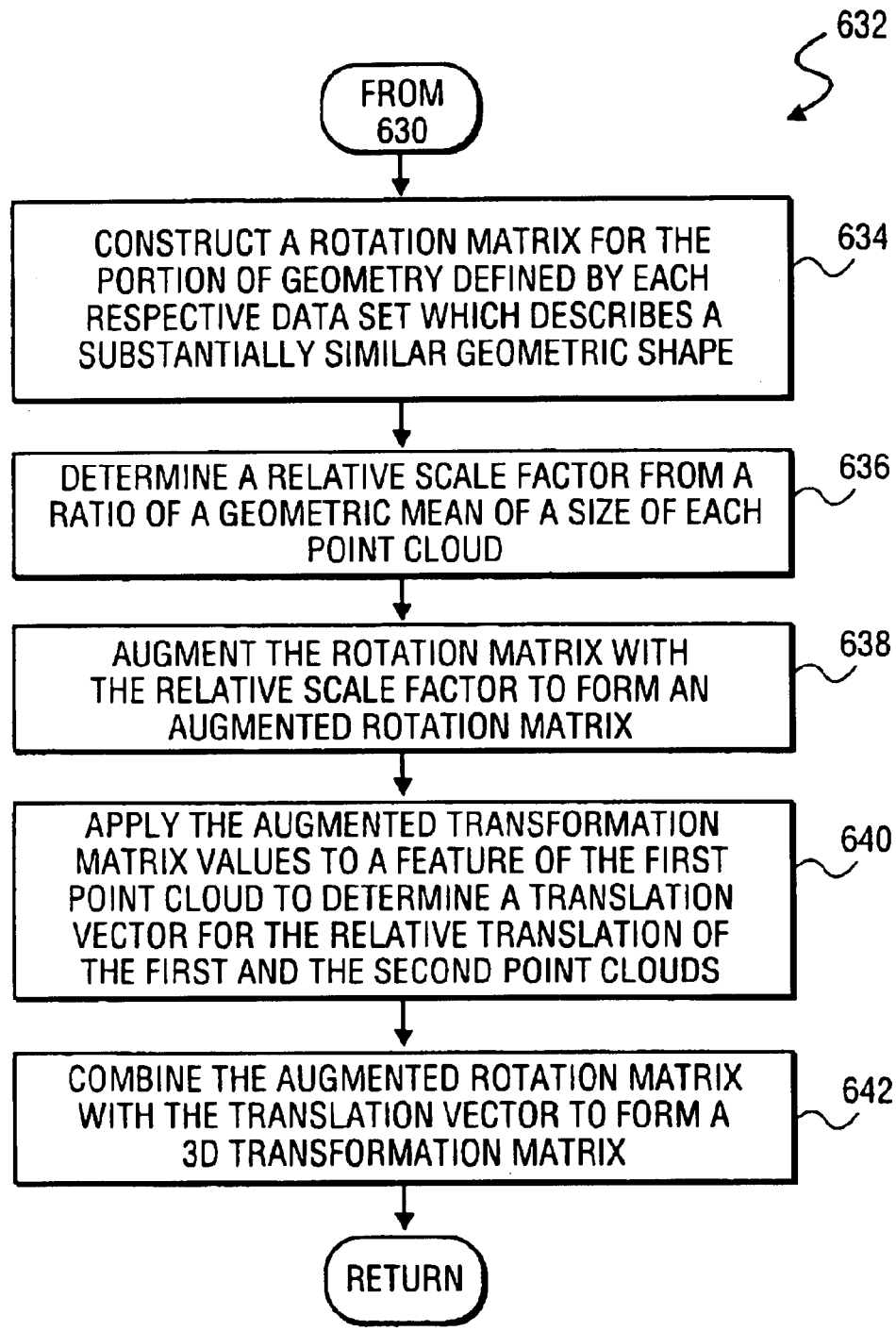
FIG. 12 depicts a flowchart illustrating a method for computing a transformation to substantially align data sets of a first point cloud and a second point cloud, while minimizing alignment error, in accordance with the further embodiment of the present invention.

Referring now to FIG. 12, FIG. 12 depicts a flowchart illustrating an additional method 622 for computing the transformation of process block 620, as depicted in FIG. 9. At process block 624, a rotation matrix is constructed for the portion of geometry defined by each respective data set that describes a substantially similar geometric shape. Next, at process block 626, a relative scale factor is determined from a ratio of a geometric means of a size of the overlapping region of each point cloud (see Equation 13). Once determined, at process block 628, the rotation matrix is augmented with the relative scale factor to form an augmented rotation matrix (see Equation 14). At process block 630, the values of the augmented transformation matrix are applied to a feature of the first point cloud to determine a translation vector for the relative translation of the first and second point clouds (see Equations 15–16). Finally, at process block 632, the augmented rotation matrix is combined with the translation vector to form a 3D transformation matrix (see Equation 17).

Referring now to FIG. 13, FIG. 13 depicts a flowchart illustrating an additional method 652 for applying the transformation to register the first point cloud relative to the second point cloud of process block 650, as depicted in FIG. 9. At process block 654, a plurality of point clouds are successively aligned wherein an Nth point cloud joins the first point cloud. Next, at process block 656, a cumulative relative misalignment (error vector $\vec{EV}$) is determined of the first point cloud and the Nth point cloud. Finally, at process block 658, the alignment of at least one preceding point cloud is adjusted to compensate for the cumulative relative misalignment. In one embodiment, method 652 is utilized in order to provide point cloud assembly for multiple aspect images of an object, while distributing the cumulative, relative misalignment error ($\vec{EV}$) as depicted with reference to FIGS. 8A–8C.

Referring now to FIG. 14, FIG. 14 depicts a flowchart illustrating an additional method 660 for applying the calculated transformation to the first cloud to register it relative to the second point cloud of process block 650, as depicted in FIG. 9. At process block 662, images containing texture corresponding to each of the point clouds are obtained. Once obtained, at process block 654, a portion of texture associated with each respective data set is identified that represents substantially the same surface. Next, process block 668, an additional transformation is computed for the first and second data sets, utilizing the texture information to align each data set while substantially minimizing texture alignment error.

Finally, at process block 670, the additional transformation is applied to the first point cloud to register it relative to the second point cloud. Accordingly, at described with reference to FIGS. 10 and 11, texture information may be utilized in place of geometric representation information, such as camera location and camera angle to determine overlapping regions, for example, overlapping regions 530, as depicted in FIG. 6.

Figure 15:
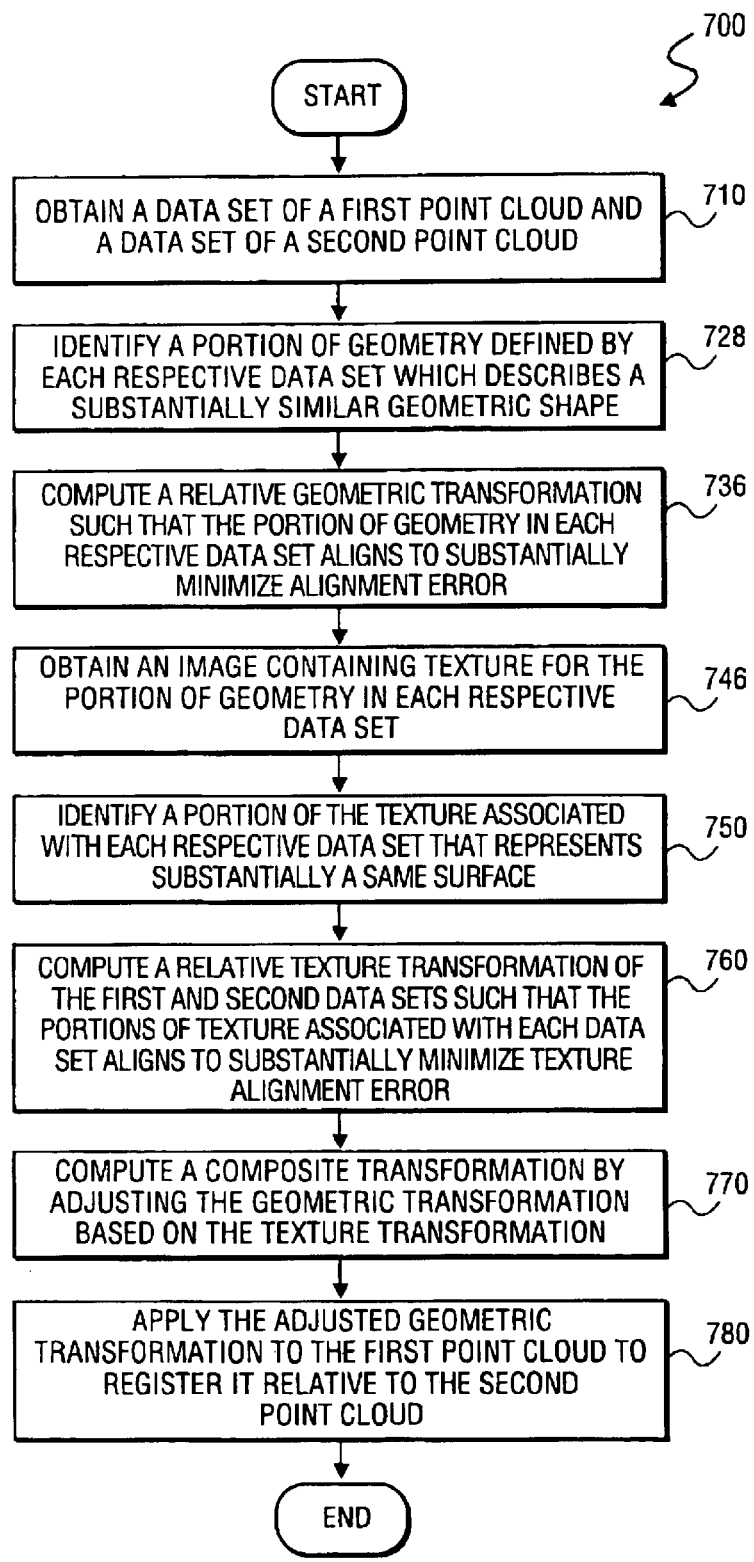
FIG. 15 depicts a flowchart illustrating a method for performing point cloud assembly, utilizing texture information, in accordance with a further embodiment of the present invention.

Referring now to FIG. 15, FIG. 15 depicts a flowchart illustrating a method 700 for performing point cloud assembly utilizing a combination of geometric reference information and texture information to determine image alignment information and overlapping image areas, in accordance with the further embodiment of the present invention. At process block 710, a data set of a first point cloud and a data set of a second point cloud are obtained. Once obtained, at process block 720, a portion of geometry defined by each respective data set is identified, which substantially describes a similar geometric shape. Next, at process block 730, a relative geometric transformation is computed, such that the portion of geometry in each respective data set align to substantially minimize alignment error.

Next, at process block 740, an image containing texture for each portion of geometry in each respective data set is obtained. Once obtained, at process block 750, a portion of the texture associated with each respective data set is identified that represents substantially the same surface. Once identified, at process block 760, a relative texture transformation is computed of the first and second data sets, such that the portions of texture associated with each data set align to substantially minimize texture alignment error. Once computed, at process block 770, the relative texture transformation may be used to adjust the geometric transformation to improve registration. Finally, at process block 780, the adjusted geometric transformation is applied to the first point cloud to register it relative to the second point cloud.

Figure 16:
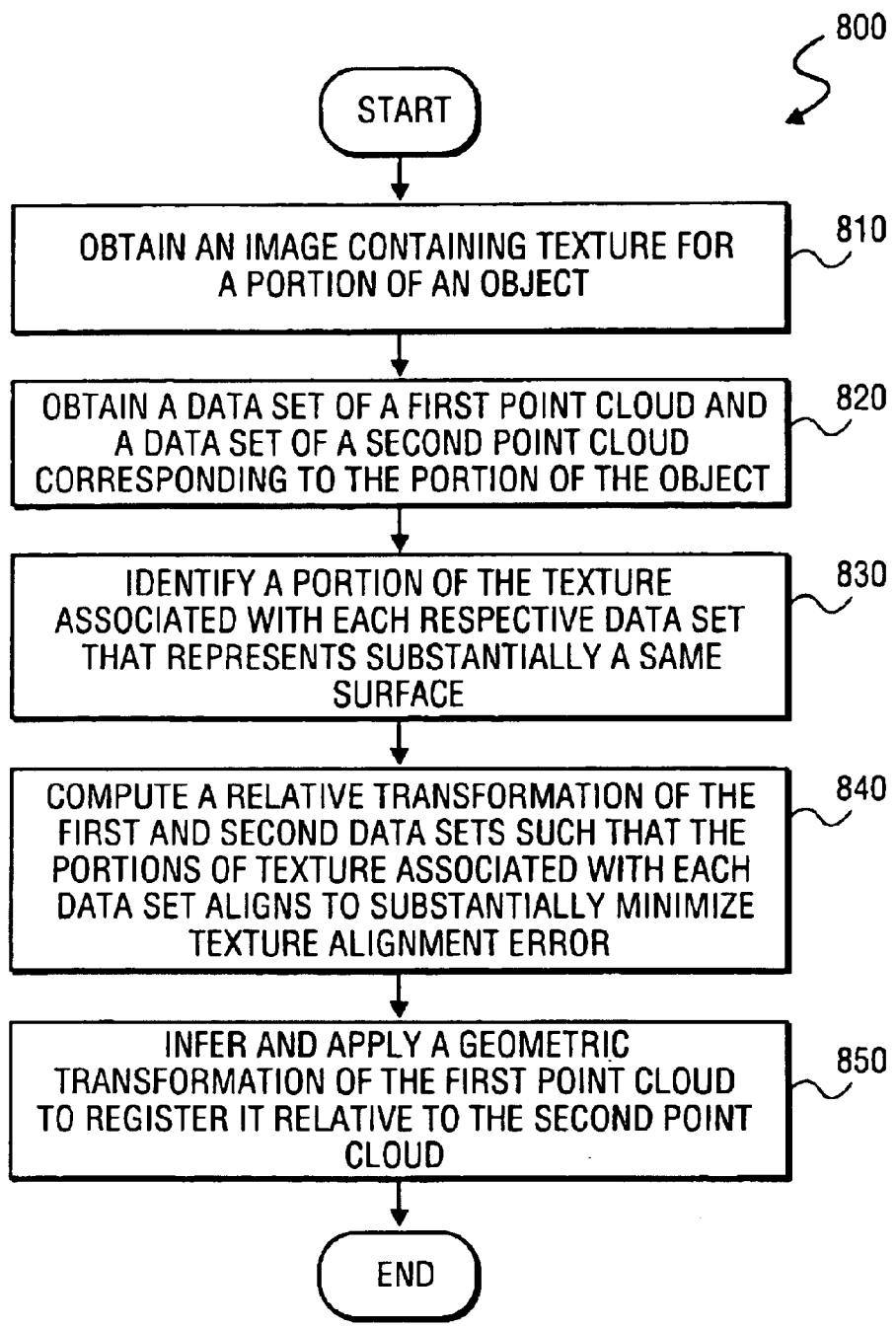
FIG. 16 depicts a flowchart illustrating a method for performing point cloud assembly, utilizing geometric reference point information, as well as image texture information, in accordance with a further embodiment of the present invention.

Finally, referring to FIG. 16, FIG. 16 depicts a flowchart illustrating a method for performing 3D point cloud assembly utilizing texture information to determine alignment or overlapping region information, in accordance with the further embodiment of the present invention. At process block 810, an image containing texture of a portion of an object is obtained. Once obtained, at process block 820, a data set of a first point cloud and a data set of a second point cloud corresponding to the portion of the object are obtained. Next, at process block 830, a portion of the texture associated with each respective data set is identified that substantially represents a same surface.

Once the portion of texture is identified, at process block 840, a relative transformation is computed of the first and second data sets, such that the portions of texture associated with each data set align to substantially minimize texture alignment error. Finally, at process block 850, the transformation is applied to the first point cloud to register it relative to the second point cloud. Accordingly, utilizing the embodiments described above, 3D point cloud assembly may be performed utilizing geometric reference information, context information, or a combination thereof, in order to determine overlapping regions.

In contrast to conventional 3D data scanning systems, some embodiments of the present invention utilize a digitizer, which employs white light in order to capture texture information of an object, utilizing, for example, stereoscopic techniques. Based on this information, embodiments of the present invention perform 3D point cloud assembly and alignment by identifying overlapping regions prior to transformation calculation. Utilizing this information, data under analysis is substantially minimized, resulting in point cloud assembly, which is performed in a drastically reduced amount of time. Accordingly, utilizing the point cloud assembly described, 3D data scanning systems are possible, which perform image acquisition, as well as image rendering, in real time.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed. Accordingly, the specification and drawings are to be regarded in an illustrative, rather than a restrictive, sense.

What is claimed is:

1. A method comprising:
   obtaining a data set of a first point cloud and a data set of a second point cloud;
   identifying a portion of geometry defined by each respective data set which describes a substantially similar geometric shape;
   computing a transformation such that the portion of geometry in each data set align to substantially minimize alignment error; and applying the transformation to the first point cloud to register it relative to the second point cloud.

2. The method of claim 1 wherein computing comprises:

generating values for a relative rotation of a portion of the identified geometry within the first and second point clouds respectively.

3. The method of claim 2 wherein computing comprises:

constructing a rotation matrix for the portion of geometry defined by each respective data set which describes the substantially similar geometric shape.

4. The method of claim 1 wherein computing comprises:

identifying a relative scale factor between a portion of the identified geometry within the first and second point clouds respectively.

5. The method of claim 1 wherein computing comprises:

generating values for a relative translation of a portion of the identified geometry within the first and second point cloud respectively.

6. The method of claim 1 wherein computing the transformation comprises:

calculating a geometric mean of a spatial distribution of the identified portion of geometry of at least one point cloud.

7. The method of claim 1 wherein computing the transformation comprises:

calculating a centroid of a spatial distribution of the identified portion of geometry of at least one point cloud.

8. The method of claim 1 wherein computing the transformation comprises:

combining calculations for a relative rotation, scale and translation of the identified portion of geometry of first and second point clouds respectively.

9. The method of claim 1 wherein the first and the second point clouds represent portions of a single physical object.

10. The method of claim 1 wherein identifying occurs substantially automatically.

11. A method comprising:

obtaining a data set of a first point cloud and a data set of a second point cloud;

obtaining an image containing texture for a portion of geometry in each respective data set;

identifying a first portion of the texture and a second portion of the texture associated with each respective data set that represents substantially a same surface;

computing a relative texture transformation of the first and second data sets such that the portions of texture associated with each data set align to substantially minimize texture alignment error;

identifying a portion of geometry defined by each respective data set which describes a substantially similar geometric shape;

computing a relative geometric transformation such that the portion of geometry in each respective data set align to substantially minimize alignment error;

adjusting the texture transformation based on the geometric transformation; and applying the adjusted texture transformation to the first texture to register it relative to the second texture.

12. A computer readable storage medium including program instructions that direct a computer to perform one or more operations when executed by a processor, the one or more operations comprising:

obtaining a data set of a first point cloud and a data set of a second point cloud;

identifying a portion of geometry defined by each respective data set which describes a substantially similar geometric shape;

computing a transformation such that the portion of geometry in each data set align to substantially minimize alignment error; and applying the transformation to the first point cloud to register it relative to the second.

* * * * *